May 26, 1959 J. T. ROOS 2,888,142
FILTER CONSTRUCTION
Filed March 19, 1957
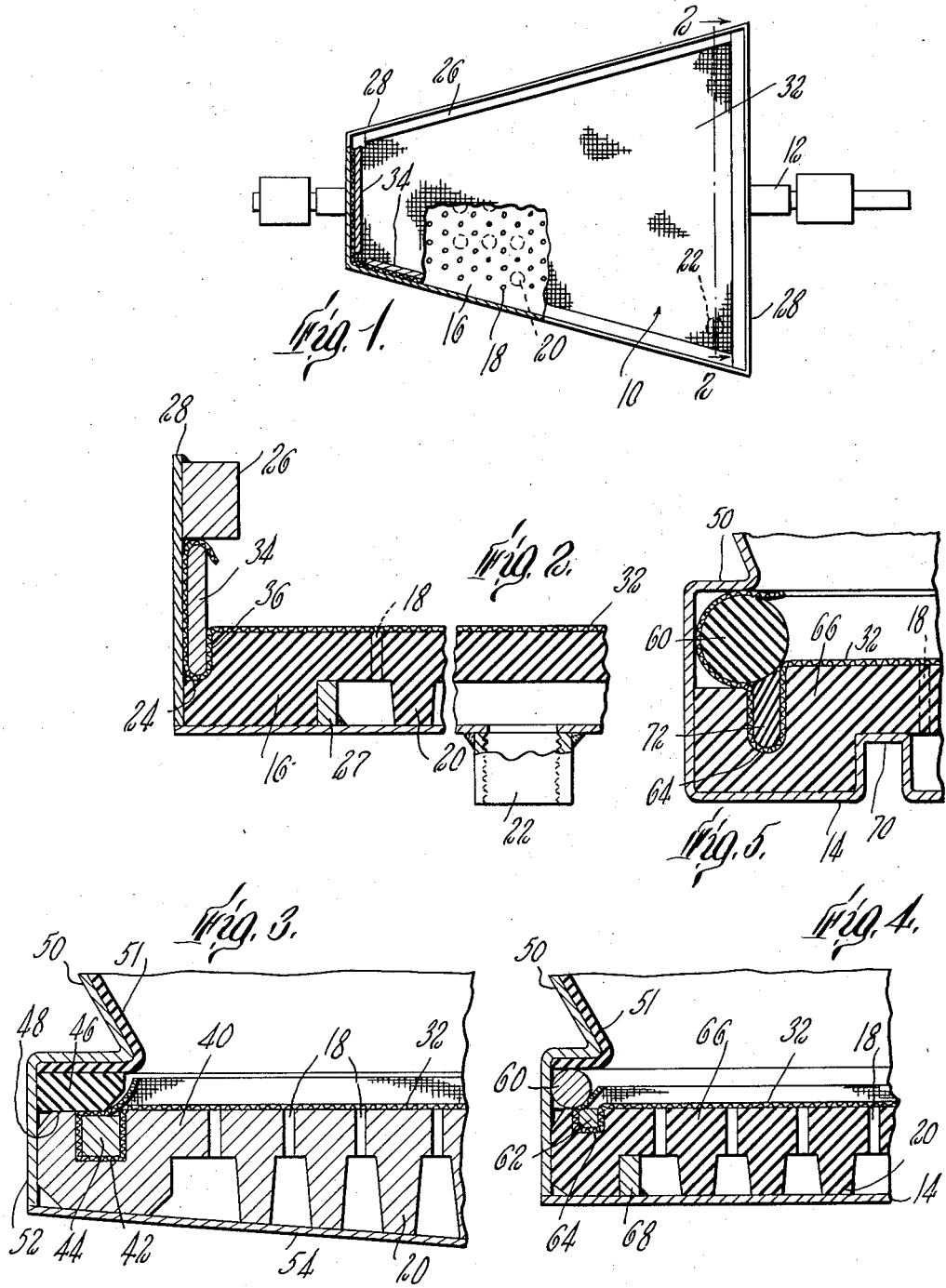

United States Patent Office 2,888,142
Patented May 26, 1959

2,888,142

FILTER CONSTRUCTION

John T. Roos, Walpole, Mass., assignor to Bird Machine Company, South Walpole, Mass., a corporation of Massachusetts Application March 19, 1957, Serial No. 647,134

6 Claims. (Cl. 210—473)

This invention relates to a pan filter of the tilting cell type and pertains more specifically to an improved means for removably holding in place in a filter cell a sheet filter medium and the false bottom support for said medium.

The present invention is applicable to any filter of the type in which the individual filter cells are inverted during the course of the filtering cycle in order to remove the filter cake therefrom and is useful with any conventional horizontal pan type filter composed of either a circular or linear array of individual cells, each of which is loaded in succession with slurry, washed, and dumped by tilting during the course of a single cycle, such as the circular filter shown in Delruelle Reissue Patent 24,150 dated May 15, 1956, or the belt filter described in Giorgini U.S. Patent 2,677,467 granted May 4, 1954.

In filter devices of the type described, there has been a problem in securing the sheet filter medium and its false bottom support securely within the individual cell in such manner that they may readily be installed and removed. Inasmuch as air pressure is commonly employed in the interior of the filter cell during its inversion to assist in removing the filter cake, and since many filter cakes tend to adhere momentarily to conventional filter cloths upon inversion of the cell, the resulting forces together with the weight of the false bottom and filter medium themselves all tend to dislodge both the filter medium and its false bottom support from their intended positions within the filter cell during inversion of the cell and removal of the filter cake. Attempts to secure the filter medium only, employing the medium itself as the means for retaining the false bottom in position subject the filter medium to excessive strain, leading to accelerated deterioration and decreased life of the filter medium.

One object of the present invention is to provide an improved hold-down construction for removably holding a filter cloth in place.

Another object of the present invention is to provide improved means for removably holding a filter cloth in place which minimizes the strain upon the cloth itself and reduces the risk of tearing or ripping the cloth.

Still another object is to provide a hold-down means which may be quickly and readily installed and removed and which is effective to hold in place both a filter medium and a false bottom support simultaneously.

Other and further objects will be apparent from the drawing and from the description which follows.

In the drawing:

Fig. 1 is a plan view, partly broken away, showing one embodiment of the present invention;

Fig. 2 is a view in section taken along line 2—2 of Fig. 1;

Fig. 3 is a view in section corresponding to that of Fig. 2 and showing a second embodiment of the invention;

Fig. 4 is a view in section corresponding to Fig. 2 and showing still another embodiment of the invention; and Fig. 5 is a view in section corresponding to Fig. 2 and showing still a further embodiment of the invention.

In the embodiment shown in Figs. 1 and 2, each individual filter cell 10 is mounted on a shaft 12, the ends of which ride on concentric circular tracks so that the whole array of cells rotates about a common vertical axis during each cycle, in the course of which each cell is filled with slurry, the filtrate is drained therefrom, and the cell is then tilted about its own shaft 12 to invert it and permit the filter cake to drop out. Mounted on the bottom 14 of each cell is a false bottom 16 which preferably is molded of resilient rubber-like material and which is provided with a plurality of apertures 18, 18 passing through it. False bottom 16 is supported in spaced relation above bottom 14 by means of a plurality of spaced supporting lugs 20, 20 molded integral with false bottom 16. A drain aperture 22 is provided in bottom 14 to remove liquid filtrate from the space between bottom 14 and false bottom 16. The marginal zone 24 of false bottom 16 is cut away or depressed below the top surface of the adjacent portions of the false bottom while a rigid metal retaining rib 26 is secured to the margin or side wall 28 of cell 10 by welding or in any other suitable manner, rib 26 projecting inwardly in spaced relation above marginal zone 24. A second rigid retaining rib 27 is welded or otherwise secured to bottom 14 in position to engage laterally the inner margin of false bottom 16. The latter, being flexible, would tend to pull out of position laterally during inversion of the cell in the absense of rib 27.

A sheet filter medium 32, which may be any conventional filter cloth, extends over and is supported by false bottom 16. An elongated removable caulking member 34, which is transversely rigid and which may be made of any suitable material such as hard rubber or resinous material, metal, or the like, is jammed or wedged between rib 26 and marginal zone 24 of resilient false bottom 16 with the marginal portion of filter medium 32 engaged between caulking member 34 and marginal portion 24. The terminal portion of filter medium 32 preferably extends upwardly alongside of and between caulking member 34 and the wall 28 of the filter cell and is engaged again between the top of caulking member 34 and rib 26. In order to install false bottom 16 and filter medium 32, these elements are simply laid in the cell with the false bottom resting upon bottom 14. The bottom edge of caulking member 34 is then inserted into position on marginal portion 24, and its upper edge, over which filter medium 32 extends, is then progressively forced beneath the rigid rib 26 to upright position, as best shown in Fig. 2. The inherent resilience of false bottom 16 permits sufficient distortion of marginal portion 24 to permit caulking member 34 to be forced into place. When the insertion of caulking member 34, which may extend only along a single side of cell 10 or which may extend continuously about all sides of the cell, is complete, it will be found that the sheet filter medium 32 is securely snubbed about the corner 36 of false bottom 16 and about both lower and upper margins of caulking member 34. Furthermore, corner 36 of resilient false bottom 16 co-operates with sidewall 28 to hold caulking member 34 securely in position.

Since caulking member 34 simultaneously holds both filter medium 32 and false bottom 16 in place, excessive strain upon the filter medium at corner 36 is avoided, thus minimizing the risk of tearing or ripping of the filter medium upon inversion of the cell.

When it is desired to remove the filter medium and false bottom, the upper margin of caulking member 34 may be pried out from under rib 26 at one end with any suitable tool, whereupon the entire caulking member may be removed by a simple manual pull.

Another embodiment of the invention is shown in Fig. 3 in which false bottom 40 is provided with a groove 42 along its marginal zone in which a mating grommet 44 of rectangular cross-sectional configuration seats while enveloped by filter medium 32. Caulking member 46 bears upon the outer marginal portion 48 of false bottom 40 and also bears on the upper face of grommet 44, caulking member 46 being retained beneath a retaining rib 50 which extends inwardly from wall 52 in spaced relation above the marginal zone of false bottom 40. Rib 50 in this embodiment is provided with a covering layer of resilient rubber-like material 51, so that false bottom 40 may be made of rigid material such as metal, thermoset or thermoplastic resinous material, hard rubber, wood, or the like. In this embodiment it will be noted that bottom 54 of the cell slopes downwardly from the margin to facilitate removal of the liquid filtrate from the space between false bottom 40 and bottom 54.

In Fig. 4 there is shown still another embodiment of the invention in which a caulking member 60 of circular cross-sectional configuration, preferably of resilient rubber-like material, is employed along with a grommet 62 of rectangular shape seated within the groove 64 of resilient false bottom 66 with the filter medium 32 being wrapped about grommet 62 and engaged between the grommet and the bottom of the groove on the one hand and between grommet 62 and caulking member 60 on the other hand. A supplemental retaining rib 68 is provided to retain the inner margin of false bottom 66.

The embodiment shown in Fig. 5 is similar to that shown in Fig. 4 except that supplemental retaining rib 70 is an integral part of bottom 14, being formed simply by a fold in the bottom, and layer 51 of resilient rubber-like material is omitted. In addition, the marginal portion of filter medium 32 extends around caulking strip 60 as well as grommet 72, both caulking strip 60 and grommet 72 being composed of resilient rubber-like material in this embodiment.

It will be noted that in each of the embodiments, the caulking member serves to engage and removably lock in place simultaneously both the false bottom and the sheet filter medium. In addition, it will be noted that the caulking member may readily be inserted and removed by working progressively from one end to the other, thus permitting the false bottom and the sheet filter medium to be cleaned and/or replaced whenever desirable. While in most cases the false bottom is of resilient rubber-like material and the elongated caulking member is rigid transversely, it is also possible to make the false bottom of hard rigid material and make the caulking member of resilient rubbery material; indeed, both the false bottom and caulking member may be made of resilient rubber-like material if desired, or both may be made of hard rigid material if the retaining rib or cell bottom is resilient as in the case shown in Figs. 3 and 4 where the cell wall is coated with rubber.

Although specific embodiments of the invention have been described herein, it is not intended to limit the invention solely thereto, but to include all of the obvious variations and modifications within the spirit and scope of the appended claims.

I claim:

1. In a filter of the type described in which each filter cell is mounted to be inverted during the filtering cycle, the improvement comprising, in combination, a false bottom disposed within and supported by the bottom of said filter cell with provision for draining liquid filtrate from between said bottom and false bottom, said false bottom having a marginal zone depressed below the level of the adjacent portions thereof, a sheet of filter medium extending over and supported by said false bottom and extending over said marginal zone, and means including a rigid retainer rib extending inwardly from the margin of said filter cell in spaced relation above said false bottom and a removable caulking member jammed between said rib and the marginal portions of said false bottom and filter medium for simultaneously securing the marginal portions of both the filter medium and the false bottom in place within said filter cell.

2. In a filter of the type described in which each filter cell is mounted to be inverted during the filtering cycle, the improvement comprising, in combination, a false bottom disposed within and supported by the bottom of said filter cell with provision for draining liquid filtrate from between said bottom and false bottom, said false bottom comprising resilient rubbery material and having a marginal zone depressed below the level of the adjacent portions thereof, a sheet of filter medium extending over and supported by said false bottom, and means for simultaneously securing the marginal portions of both the filter medium and the false bottom in place within said filter cell, said securing means comprising a rigid rib extending inwardly from the margin of said cell in spaced relation above said marginal zone, and a removable transversely rigid, elongated caulking member extending along the margin of said cell jammed between said marginal zone and said rib to hold said false bottom in place with the marginal portion of said filter medium engaged between said caulking member and said marginal zone.

3. A filter as defined in claim 2 in which the terminal portion of the filter medium extends upwardly between said caulking member and the wall of said filter cell and across the top of the caulking member engaged between said caulking member and said rib.

4. A filter as defined in claim 1 in which said false bottom comprises resilient rubbery material and includes a groove in its upper face extending along its marginal zone, and said securing means includes a rib extending inwardly from the margin of said cell in spaced relation above said marginal zone, a grommet seated in said groove and enveloped by a marginal portion of said filter medium, and an elongated caulking member extending along the margin of said cell jammed between said rib and said marginal zone and bearing on said grommet with the marginal portion of the filter medium engaged between said grommet and said caulking strip.

5. A filter as defined in claim 1 in which said false bottom comprises resilient rubbery material and includes a groove in its upper face extending along its marginal zone, and said securing means includes a rib extending inwardly from the margin of said cell in spaced relation above said marginal zone, a grommet seated in said groove and holding a marginal portion of said filter medium in said groove, and an elongated caulking member extending along the margin of said cell and jammed between said rib and said marginal zone and bearing on said grommet with the marginal portion of the filter medium extending between said marginal zone and said caulking strip and between said caulking strip and rib.

6. In a filter of the type described in which each filter cell is mounted to be inverted during the filtering cycle, the improvement comprising, in combination, a resilient rubbery false bottom disposed within and supported by the bottom of said filter cell with provision for draining liquid filtrate from between said bottom and false bottom, said false bottom having a downwardly extending marginal flange engaged between the margin of said cell and an upstanding rib secured to the bottom of said cell, a sheet of filter medium extending over and supported by said false bottom, a rigid retainer rib extending inwardly from the margin of said cell in spaced relation above said false bottom, and a removable caulking member jammed between said rib and the marginal portions of said false bottom and filter medium to hold both said false bottom and said medium in place in said cell.

References Cited in the file of this patent

UNITED STATES PATENTS

| | | |
|---|---|---|
| Re. 24,150 | Delruelle | May 15, 1956 |
| 667,005 | Davis | Jan. 29, 1901 |
| 1,649,822 | Furbish | Nov. 22, 1927 |
| 2,061,351 | Denhard | Nov. 17, 1936 |